Oct. 31, 1972   M. D. APPLEMAN   3,701,728
WATER PURIFICATION SYSTEM
Original Filed Aug. 11, 1966
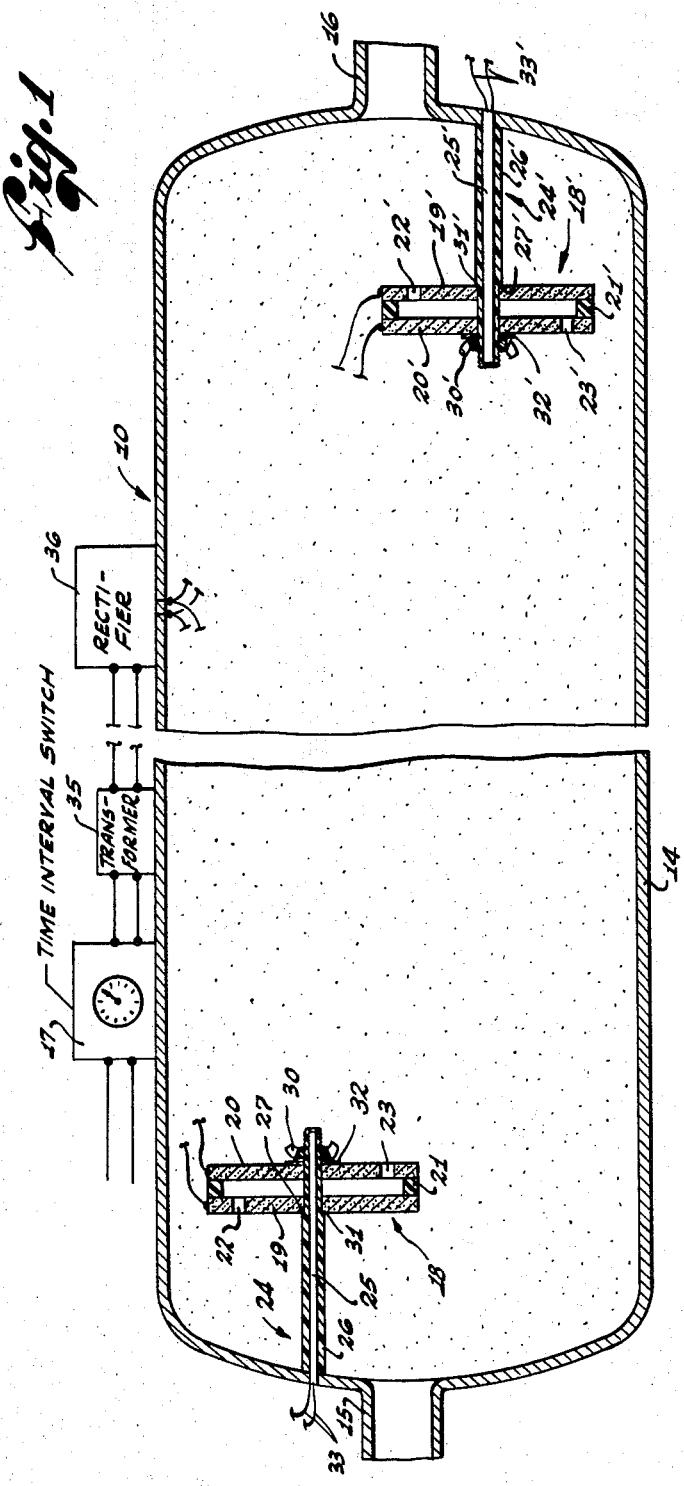
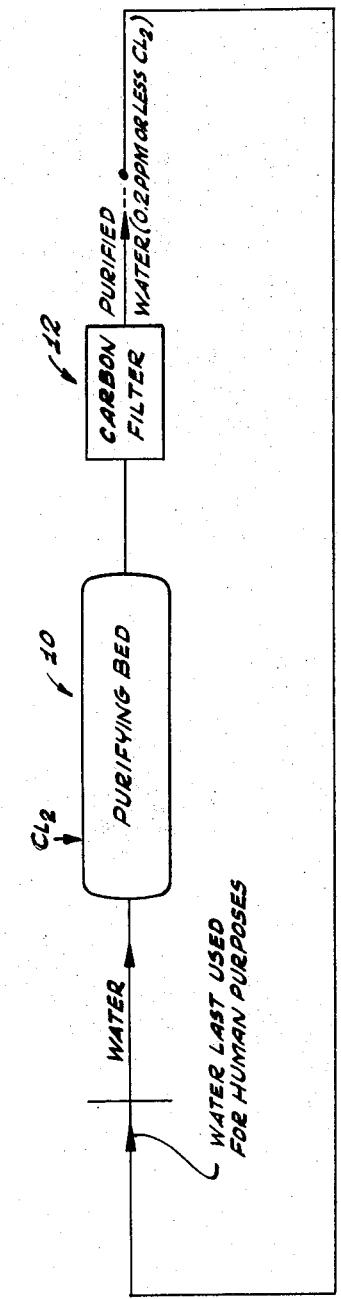
INVENTOR.
MILO DON APPLEMAN
BY Fulwider, Patton, Rieber
Lee, and Utecht
ATTORNEYS 3,701,728
WATER PURIFICATION SYSTEM
Milo Don Appleman, Los Angeles, Calif., assignor to Terminal Testing Laboratories, Inc., Lucille E. Appleman, and Milo D. Appleman, Jr., all of Los Angeles, Calif., fractional part interest to each
Continuation of application Ser. No. 571,834, Aug. 11, 1966. This application May 22, 1970, Ser. No. 41,672
Int. Cl. B01d 15/04; C02b 1/36
U.S. Cl. 210—29
4 Claims

ABSTRACT OF THE DISCLOSURE

A method of purifying water which comprises introducing bacteriacidal chlorine directly into, or just prior to purification media for said water at concentrations substantially above potable limits so that essentially all of the chlorine is available for reaction to kill microorganisms trapped in said purification material.

---

This invention relates to a process for purifying aqueous liquids.

Most circulating water systems employ filters and/or ion exchange beds to remove various suspended and dissolved matter from the water. Such dissolved matter comprises both organic and inorganic matter. Part of the removed organic matter consists of microorganisms which use the nitrogenous and carbonaceous impurities entrapped on the filter or in the ion exchange beds as a culture in which they multiply to astronomical proportions. These microorganisms gradually "leak" into the cleaned water increasing the total concentration of microorganisms in the water.

In the present water systems, such as in swimming pool systems and household potable water systems, the microorganism-destroying agent, e.g., chlorine, residual concentration must be kept at such low levels that microorganisms in filters and the like rapidly multiply. The low chlorine level in these ssytems exists because certain human factors, such as skin and olefactory sensitivity, require that the chlorine level in water used by human beings be kept at about 0.5 p.p.m. and in some cases, such as for potable water, at about 0.2 p.p.m. At these low chlorine concentrations, the chlorine is used up within a few centimeters of the inlet to the filter or ion-exchange bed, thereby allowing the microorganisms to continue growing in the remaining part of the bed.

In present aqueous systems, to insure that sufficient microorganism-destroying agent reaches the filters and the like, it would be necessary to increase the microorganism-destroying agent concentration substantially above the levels suitable for human use. This quantity is needed because, in present aqueous systems, the microorganism-destroying agent must react with all the organic matter in the system, i.e., amounts of such agents are not added to specific locations in the water system to act only on the organic matter at the designated locations.

Sterilization of these filters and ion exchange beds is usually accomplished by removing these beds from service and then washing with water having a very high chlorine content in the range of 50 to 100 p.p.m. of chlorine. They are also backwashed to remove all the organic matter. Generally, all the water used in the sterilization step is sent to a drain and is lost to further use. The sterilized filter or ion exchange bed is then placed in service. However, it soon traps organic matter including microorganisms which rapidly multiply and even though the bed is still effective in removing other impurities from the water, and of softening the water, microorganisms are nevertheless fed into the otherwise substantially impurity-free water.

Present pool systems generally employ filter units which are less efficient than many presently available industrial filters. These less-efficient filters entrap less organic matter, thereby reducing the amount of material available for microorganisms in growth, and thus somewhat reduce the number of microorganisms in the filter unit. Such a reduction in the microorganisms count, however, is attained at the expense of increased concentration of organic matter in the water. An identical situation exists relative to the entrapment of bacteria and other organic materials in both the household and commercial water softeners and industrial carbon and other filters in all of which the microorganisms may grow to astronomical numbers per milliliter of water as the chlorine used for disinfection of the water has been dissipated.

Thus, it would be highly desirable to provide a method for controlling the growth of microorganisms in flowing water systems employing filter units while, simultaneously, removing as much organic matter from the water as present filters are capable of removing. It would be especially desirable to produce the aforementioned results by the use of a microorganism-destroying agent, e.g., chlorine, while maintaining the microorganism-destroying agent in the effluent below the maximum allowable limits for potable water.

In view of the foregoing, it is a major object of this invention to retard the growth of microorganisms in flowing water systems while maintaining the bactericidal agent at concentration below potable water limits in the effluent water.

It is another object of this invention to provide a method for treating water which effectively maintains the concentration of microorganisms in filters and the like at minimal levels to substantially eliminate the leakage of microorganisms into the circulating water, thereby providing water of purer quality.

It is still another object of this invention to provide a method for purifying water which produces water having as low a microorganism level as water purified by prior art methods without the undersirable taste of chlorine produced by the prior art chlorination process in reaching such low microorganism level.

It is a still further object of this invention to provide a method for decreasing the concentration of microorganisms, in filters and the like, which is both effective and simple in operation.

Other objects and advantages of this invention will become apparent from the following description and drawing, in which:

FIG. 1 is a cross-sectional view of an apparatus incorporating the purification means of this invention; and FIG. 2 is a schematic flow sheet of the apparatus in a typical water-purifying cycle.

In general, the process of this invention comprises adding a microorganism-destroying agent to the water in generally continuous-flow aqueous systems at the locations in such systems, at or very near the point where organic matter is being removed as by filtration. The microorganism-destroying agent is added continuously or at intervals in amounts sufficient to prevent the microorganism count from rising above certain desired levels. Addition of a microorganism-destroying agent is in almost all cases above potable limits, e.g., above 0.5 p.p.m. at filtration locations in aqueous systems and provides increased control of the growth of microorganisms in filters and the like. Yet, the use of microorganism-destroying agents in the manner described produces effluent water having microorganism-destroying agent concentrations within the allowable potable water limits.

More specifically, the process of this invention comprises the addition of a microorganism-destroying agent preferably directly to filter units, such as filters, water softeners and purification beds, by either, in situ, electrolytic generation or mechanical means. The addition of microorganism-destroying agents to the water may take place within the filter units or prior to the water entering the filter unit but the addition is made beyond that point where the water is last taken for use. Regardless of which method is used, the heretofore-described advantages will be obtained. The amount of chlorine periodically or continuously available to the water in the bed is of concentration generally well in excess of 0.2 p.p.m., e.g., 0.5 p.p.m. or higher, but, by adequate control, the effluent water contains less than the amount required for human use, usually less than about 0.2 p.p.m.

Hereinafter, the term "purification bed" will be used to designate water softeners, ion-exchange beds and filter beds. Additionally, "chlorine" will usually be referred to herein as the anti-microorganism material because of its present prevalent use in aqueous systems to destroy bacteria and the like. It will be understood, however, that neither of these terms limits the scope of this invention and that the method of this invention can be applied to any unit which acts as a filter and can be used with any anti-microorganism material compatible with human uses.

As stated, chlorine may be added to the water upstream from the purification bed, that is, chlorine may be added to the water prior to its entry into the purification bed. If this method of addition is used, the amount of chlorine to be added to the water is determined by trial-and-error methods. Chlorine is added to the water in increasing amounts, usually well above potable limits, until the chlorine concentration in the effluent from the purification bed shows traces of chlorine. When the effluent water contains a trace of chlorine, this indicates that the chlorine added upstream from the purification bed has been added at a concentration just sufficient to destroy substantially all the microorganisms in the water between the chlorine addition point and the effluent point of the ion-exchange bed. Any excess chlorine in the effluent water may be readily removed by passing it through a charcoal filter, chlorides being formed by reaction with the charcoal.

Chlorine is preferably added, however, at the purification unit, i.e., in situ, by an automatic or semi-automatic means such as by an electrolysis apparatus controlled by a chlorine-analysis device capable of measuring and controlling the chlorine concentration in the effluent or controlled by a timing device. Use of an electrolytic apparatus with a purification bed means that no allowance need be made for chlorine losses in the water before it reaches the purification bed. Only the amount of microorganisms and other organic material in a purification bed need be considered. Additionally, an electrolytic apparatus can be easily operated by merely throwing a switch to activate or inactivate the electrolytic apparatus.

The experimental evidence indicates that chlorine added in the just-described manner will cause the microorganism count to very quickly be reduced to very low levels, e.g. 5000 count per gram or less without any significant chlorine escape into the effluent water. After reduction to the low level, chlorine generation can be continued and the concentration in the effluent is controlled by means of analyzer operatively connected to the chlorine generating means to maintain the effluent below potable water limits of about 0.2 p.p.m. or by passing the effluent through a charcoal filter, or by both means taken together.

The chlorine released directly into the purification bed is released simultaneously over a significant volume of the bed and is thus not subject to entrapment and inactivation by the material comprising the purifying media of the purification bed to the same degree as chlorine released into the water upstream from the bed. For example, where a material such as activated charcoal is used as a water purifier, the carbon reacts with chlorine to reduce it to the chloride form which is ineffective as a microorganism destroyer. Therefore, when all the chlorine has to pass the total length of a purification bed where a filtering medium is present, the chlorine will be less effective in destroying microorganisms than is chlorine which has been injected into the media at numerous points in the bed.

Referring now to FIG. 1, numeral 10 designates a water-purifying unit comprising a purifying bed, e.g., an ion-exchange bed 11 and electrolysis units. The purifying bed 11 may be of the typical ion-exchange type containing, for example, zeolite, encased in a shell 14 which may be made of any suitable material, such as metal and reinforced glass. Water flows into the ion-exchange bed 11 at one end 15 and flows out of the ion-exchange bed at the opposite end 16 in purified form.

The electrolysis unit is mounted on the shell 14 and comprises a timing unit 17 mounted on the external side of the shell together with electrolytic cells 18, 18' mounted within the shell 14. Both the timing unit 17 and the electrolytic cells 18, 18' may be mounted, as by bolting each unit to the shell 14, where easy assembly and disassembly are required, or by welding these units to the shell 14 where a more permanent arrangement is desired. Appropriate openings (not shown) in the shell 14 permit insertion and removal of the electrolytic cells 18, 18'.

The timing unit 17 is a standard timer which can be adjusted to automatically activate the electrolytic cells 18, 18' at periodic intervals or which can be manually operated to cause the electrolytic cells 18, 18' to discharge chlorine into the ion-exchange bed 11 when unequal periods of chlorination are required; for example, when a highly contaminated bed is originally being subjected to chlorination by the process of this invention. It will be understood that a completely automatic chlorine control apparatus could be used in place of the timing unit 17 so that chlorine input to the purification beds 11 would be automatically adjusted in terms of the chlorine concentration in the effluent water from the purification bed.

Each electrolytic cell 18, 18' consists of a pair of circular carbon discs or electrodes 19, 20, 19', 20' spaced axially from each other by an electrical insulating ring 21, 21'. The size of the discs 19, 20 can vary depending upon the size of the unit 10. I have found that discs about six inches in diameter and about 0.5 inch thick provide satisfactory electrodes. The insulating ring may be composed of any suitable material which is capable of electrically insulating the discs 19, 20, 19', 20' from each other. For example, nylon rings are good electrical insulators which withstand the aqueous environment.

To permit fluid flow through the electrolytic cells 18, 18', each disc 19, 20, 19', 20' is shaped to form a hole 22, 23, 22', 23', respectively, therethrough. These holes 22, 23, 22', 23' permit water to flow in at one hole 22, 22' and out the other hole 23, 23' so that such water can be subjected to electrolysis. Additionally, the chlorine and oxygen formed within the electrolytic cells 18, 18' can escape therefrom through either of the holes 22, 23, 22', 23'.

The components (19, 20, 21, 19', 20', 21') of the electrolytic cells 18, 18', respectively, may be held together in any convenient manner, as by bonding, or as shown in FIG. 1. In FIG. 1, the cells 18, 18' are each held together and simultaneously located within the water-purifying unit 10 by supporting rods 24, 24'. The supporting rods 24, 24' each comprises inner metallic rods 25, 25' and outer tubular rods 26, 26' which form an insulating coating on the rods 25, 25'. The outer diameter of tubular rods 26, 26' changes abruptly thereby forming a shoulder 27, 27' approximately midway between the ends of rods 26, 26'. The smaller end of tubular rods 26, 26' are threaded to accept nuts 30, 30'.

The components of the electrolytic cells 18, 18' are held together by passing the smaller diameter ends of supporting rods 24, 24' through aligned openings 31, 32, 31', 32', in the electrode discs 19, 20, and 19', 20', respectively. The openings 31, 32 and 31', 32' have a diameter larger than the smaller diameter of supporting rods 24, 24', but smaller than the larger diameter of the supporting rods. Thus the smaller diameter ends of the rods 24, 24' pass through the discs 19, 20, 19', 20' until the discs 19, 19' abut shoulders 27, 27'. The nuts 30, 30' can be rotated onto the threaded ends until they abut the electrode discs 20, 20' whereupon the electrolytic cells 18, 18' are firmly affixed on the supporting rods 24, 24', respectively.

The larger diameter end of the supporting rod 24, 24' are each attached to a removable plug (not shown) in the shell 14 of the water-purifying unit 10 to locate the electrolytic cells 18, 18' at any desired position in the unit 10.

Each disc 19, 20, 19', 20' of the electrolytic cells 18, 18' is connected by insulated wires 33, 33' to the timing unit 17. To further protect the wires 33, 33' and to provide for easy removal of the wires, a tube (not shown) may be substituted for the supporting rod 24 so that the wires can be passed out through the axial hole in such a tube.

One electrolytic cell 18 is mounted near the inlet end 15 of the water-purifying unit 10 and the other electrolytic cell 18' is mounted near the outlet end 16. Two sets of electrolytic cells are used and mounted in this manner because it has been found that this arrangement is more efficient than a single electrolytic cell mounted at one end of the unit 10. As the number of electrolytic cells in spaced relationship along the longitudinal axis of the water-purifying unit 10 increases, the amount of chlorine liberated at each electrolytic cell can be decreased since each electrolytic cell is, in effect, responsible for the destruction of microorganisms in a smaller volume. Such a decrease in the amount of chlorine provides finer control of the electrolysis process and thereby ensures the production of potable water having an extremely low chlorine concentration while simultaneously providing water having a low microorganism count. There are, however, limitations to the number of electrolytic cells. This is due to the added problem of inserting a multiplicity of electrolytic cells into a water-purifying unit and to the increased impedance to flow due to a large number of electrolytic cells. It has been found that two electrolytic cells located as described provide excellent results.

The inlet electrolytic cell 18 may be located at the entrance end 15 of the water-purifying unit 10 or it may be located within the unit at some distance from the inlet end 15. For best results, it has been found that the electrolytic cell 18 should be placed ¼ to ⅓ of the way in from the inlet end of a standard length household ion-exchanger. In this position, the flow of chlorine to the outlet end and the diffusion of chlorine to the inlet end are well balanced to provide optimum coverage of the exchanger bed with a minimum of chlorine.

To make the water-purifying unit 10 operable in the average household, a step-down transformer 35 and a D-C rectifier 36 are connected in series to the electrodes 19, 20. This enables the standard household AC voltage of 110–120 volts to be reduced to DC voltage of about 10 volts and about 50 amperes at the electrodes 19, 20.

In operation, water containing microorganisms and other organic matter flows into the ion-exchange unit 10 at the inlet end 15 and flows through and around the electrolytic cells 18, 18'. Microorganisms and other organic matter are removed by the filtering action of the material 11 and the water is softened in the case of an ion-exchanger. The entrapped microorganisms multiply in the ion-exchange unit 10 using the other entrapped organic material as food. However, before they can multiply to any appreciable extent, the timing unit 17 which has been preset, moves to the "on" position causing current to pass between the carbon discs 19, 20 and 19', 20' of each electrolytic cell 18, 18'. This causes the chlorides in the water to undergo the following idealized reaction:

$$Cl^- + H_2O \rightarrow Cl_2 + OH^-$$

The bactericidal chlorine so produced then reacts with the microorganisms to destroy them. In addition, some electrolysis of the water apparently occurs in which nascent oxygen is released.

The timing unit 17 may act at periodic pre-set intervals to activate the electrolytic cells 19', 20', or the timing unit may be adjusted to remain on continuously to supply very low power to the electrodes. It has been found that operation of the water-purifying unit 10 at a power output of 500 watts at the electrodes for about one minute at about six-hour intervals, effectively maintains the microorganism level within the range between about 100 to about 1000 per gram of ion-exchange material. On the other hand, if the ion-exchange bed has previously been allowed to become extremely contaminated with microorganisms, a number of cycles will be required to lower the microorganism content to a few thousand per gram. The microorganism count after each of a series of cycles of one minute duration at a power level of 500 watts is shown in Table 1.

TABLE 1

| Cycle: | | Microorganism count (per gram) |
|---|---|---|
| 0 | million | 60 |
| 1 | do | 45–50 |
| 2 | do | 30–35 |
| 3 | do | 20 |
| 4 | do | 8 |
| 5 | | 500,000 |
| 6 | | 100,000 |
| 7 | | 10,000 |
| 8 | | 4,000 |

The microorganism level in the test shown in Table 1 thus eventually decreased to below 5000 per gram. It is to be understood that the microorganism count arrived at when starting with an ion-exchange unit having a low microorganism count may be lower than the microorganism count arrived at when starting with a relatively high microorganism count, since, in the latter case, the chlorine may be partially used up interacting with the accumulated microorganism bodies which have previously been destroyed.

It has not been possible to measure the chlorine concentration within the purification bed; however, it is believed that the chlorine concentration within the bed increases to about 1.0 part per million parts of water (p.p.m.) when 500 watts are applied at the electrodes for intervals of one minute every six hours. However, the effluent water from the ion-exchanger is found to have a chlorine concentration only from about 0.01 p.p.m. to about 0.10 p.p.m. because of interaction with the organic matter generally present in the purification beds. Thus, it can be seen that the chlorine concentrations in the water leaving an ion-exchanger are well below the maximum allowable chlorine concentration of about 0.2–0.3 p.p.m. for potable water.

To insure that no excess chlorine above desired limits is present in the effluent, a charcoal filter may be employed. The effluent water, from the purifying bed 10, then may be merely passed through the filter 12, (see FIG. 2) on its way to actual use.

The advantage of the chlorination method of this invention can be shown by comparing the chlorine concentration-time requirements for a potable water system with and without this invention. As noted, the chlorine level in potable water is restricted to about 0.2 p.p.m. At such a chlorine concentration, it would require about 5 to 20 minutes, depending upon the initial microorganism count, to destroy most of the bacteria in an ion-exchange bed. However, where the potable water system is in fairly constant use, the available time is only about 10–15 seconds. For such short times, chlorine concentrations of about 5.0 p.p.m. are necessary to destroy the microorganisms. However, such large chlorine concentrations cannot be used in city waters because this chlorine concentration would not be reduced to the limit of 0.2 p.p.m. in every household, due to the different water supply systems and different water usages. Thus, at the low 0.2 p.p.m. chlorine level for periods of 10–15 seconds, the microorganisms will not only not be destroyed, but they will continue to multiply and, in turn, will leak into the water leaving the ion-exchange bed. By comparison, when potable water systems are employed in the method of this invention, both the chlorine level and the microorganism level can be controlled at very low levels.

Where this invention is to be employed in conjunction with, for example, a swimming pool, additional chlorine may be added to the water after it leaves the aforedescribed water-purifying unit, but before the water reaches the swimming pool. When this procedure is followed, it will be found that much smaller quantities of chlorine are needed to maintain the swimming pool at the same bacterial level. For example, it has been found that for a swimming pool of approximately 10,000 gallons capacity, about 2 gallons of 60% bleach in the summer are required to maintain a chlorine level of about 1.0 p.p.m. By comparison, when the method of this invention is used, only about 0.5 gallons of 60% bleach are required to maintain the chlorine content at 1.0 p.p.m.

In general, no chloride salts need be added to the water being purified, since most waters have sufficiently high chloride content to chlorinate by the method of this invention. If, however, insufficient chloride exists in the water supply, then, for example, sodium chloride may be added to the water prior to entering the ion-exchange bed. It should be noted also that the water softener is recharged with sodium chloride. The longer the softener is used, the greater is the release of chloride ion which will participate in the electrolytic process.

The following examples further describe the chlorination method of this invention:

EXAMPLE 1

This example indicates the appreciable reduction in bacteria obtainable by the process of this invention even when the exchanger is initially highly contaminated. Throughout the test, the chlorine levels in the effluent from the exchanger were well within the potable water requirements.

A pair of electrodes, connected to an appropriate power source, were inserted into an ion-exchange bed containing about 24 pounds of Amberlite resin. This test facility was constructed as previously described herein. The power input to the electrodes was about 500 watts.

The bacterial count of the local water used in this test was determined to be about 94 bacteria per milliliter.

To duplicate the bacterial condition of an ion-exchanger in normal use in an average household, local water was passed through the exchanger at various flow rates both intermittently and continuously. These conditions were continued for 10 days. No chlorination of the exchanger occurred during this time. At the end of this period, a representative 10 gram sample was taken from the exchanger and a bacterial count was made on this sample.

The electrolysis was begun during the eleventh day. Each electrolysis cycle lasted about one minute. Cycling occurred at 60 minute intervals. Representative 10 gram resin samples were taken from the exchanger at the end of each cycle and a bacterial count was run on each.

The results of this test are given below in Table 2.

TABLE 2

| Day | Cycle | Average count bacteria/ ml. water |
|---|---|---|
| 0 | (¹) | 94 |
| 10 |  | ² 60 |
| 11 | 1 | ² 45 |
|  | 2 | ² 33 |
|  | 3 | ² 20 |
|  | 4 | ² 8 |
|  | 5 | 650,000 |
|  | 6 | 102,000 |
|  | 7 | 9,000 |
| 12 | 8 | 18,000 |
|  | 9 | 4,900 |
|  | 10 | 2,900 |
|  | 11 | 1,000 |
|  | 12 | 1,000 |

¹ Test water.
² Million/gram resin.

As can be seen from Table 2, the bacterial count in the bed built to the extremely high level of 60 million bacteria per gram resin in the absence of electrolysis.

However, electrolysis rapidly reduced the bacterial level in the bed to a relatively low 1000 bacteria per gram resin.

It will be noted that the bacterial count increased from 9,000 to 18,000 between cycles 7 and 8. This occurred because the exchanger was not subjected to electrolysis during the night between the eleventh and twelfth days. This period lasted for approximately 19 hours and permitted the remaining bacteria to multiply on the non-living organic material present in the exchanger.

EXAMPLE 2

This example further illustrates the decontamination of a highly contaminated ion-exchanger using the process of my invention. Additionally, it indicates the extremely low levels to which the effluent water drops when the bed bacterial count is reduced to relatively low levels.

The test was conducted in the same manner as described in Example 1, and the results are shown in Table 3.

TABLE 3

| Day | Cycle | Bacterial count filter bed/gram | Effluent water (bacteria/ ml.) |
|---|---|---|---|
| 15 |  | ¹ 58 | 500–1,000 |
| 16 | 1 | ¹ 51 |  |
|  | 2 | ¹ 25 |  |
|  | 3 | ¹ 14 |  |
|  | 4 | ¹ 8 |  |
|  | 5 | ¹ 1.5 |  |
|  | 6 | 300,000 |  |
|  | 7 | 560,000 |  |
|  | 8 | 131,000 |  |
|  | 9 | 60,000 |  |
| 17 | 10 | 13,000 |  |
|  | 11 | 11,000 |  |
|  | 12 | 4,800 |  |
|  | 13 | 3,300 |  |
|  | 14 | 2,800 | 6–7 |

¹ Million.

Again the bacterial count increased over night between the sixteenth and seventeenth day in the absence of electrolysis.

As will be noted from Table 3, the bacterial count in the effluent was reduced to a safe level of less than 10. A bacterial count of 300 to 500 bacteria per milliliter is considered unsafe.

EXAMPLE 3

This example indicates the low levels at which the bacterial count can be held when starting with a "clean" ion-exchanger when such exchanger is subjected to electrolysis by the process of my invention. It further indicates the low bacterial level obtainable in the effluent water. Furthermore, these results were achieved while maintaining the chlorine level of the effluent water within potable water chlorine limits.

This test was conducted, as previously described in Example 1, except that electrolysis was started at the same time that water was passed through the exchanger, thereby starting with a relatively uncontaminated exchanger.

The results of this test are given in Table 4.

TABLE 4

| Cycle | Bacteria count/ gram resin | Effluent water (bacteria ml.) |
|---|---|---|
| 0 | 300 | 1 |
| 4 | 1,000 | 10 |
| 52 | 1,250 | 11 |
| 100 | 1,800 | 16 |
| 200 | 1,600 | 13 |
| 556 | 1,800 | 19 |
| 724 | 11,000 | 30 |
| 872 | 14,000 | 44 |

NOTE.—Total time—36 days.

Although the organic matter is apparently accumulating, the organisms are destroyed almost as efficiently as usual. During this period the organism level was maintained at a safe level of less than 45 bacteria per milliliter.

EXAMPLE 4

This example illustrates the effectiveness of my invention even where nutrient has been introduced into the ion-exchanger.

The previously described ion-exchanger was inoculated with an aqueous solution containing 300 grams of soil, 1 liter of nutrient broth and 2 gallons of water. This composition was left in the exchanger for about 4 hours to permit adequate growth of bacteria.

At the end of this period, the exchanger was flushed with tap water for about 40 minutes. The water ran clear for about 35 minutes of this time, indicating that substantially all of the soil had been removed. A sample of both the effluent water and the resin was taken at the end of the flushing step. Both samples were tested for bacteria count.

Electrolysis was then begun and performed every hour for 75 hours. The results are shown in Table 5.

TABLE 5

| Cycle | Bacteria count/ gram resin | Effluent water (bacteria/ ml.) |
|---|---|---|
| 0 | [1] 200 | 3,000 |
| 3 | [1] 90 | 1,700 |
| 27 | 16,000 | 220 |
| 51 | 20,000 | 82 |
| 75 | 7,600 | 28 |

[1] Million.

Thus, it can be seen from Table 5 that, even though a heavy inoculum is added to the exchanger, a safe bacterial level is reached within a few days.

As has been shown by the foregoing description and examples, the chlorination method of this invention introduces large concentrations of chlorine at the purification bed or filter in such a way as to produce only traces of chlorine in the effluent water from the ion-exchange bed or filter, while simultaneously reducing and maintaining the microorganism count in the particular bed at extremely low levels. The introduction of chlorine into the filtering unit may be either continuous or intermittent. In either case, the total amount of chlorine used as compared to prior art water purification methods is significantly lower due to the greater efficiency of the method of this invention in destroying microorganisms. Such increased efficiency is due to the recognition that microorganisms can and do grow to astronomical proportions in purification beds and the like and due to the use of moderately high chlorine levels directly and solely at these growth points. This method results in the chlorine reacting to a maximum extent with microorganisms and to a minimum extent with other organic matter.

While certain embodiments are disclosed herein, modifications which lie within the scope of this invention will occur to those skilled in the art. I intend to be bound only by the scope of the claims which follow.

I claim:

1. A method of producing substantially purified potable water from source water containing chlorine compounds and microorganisms and other organic matter, comprising:

passing said source water through an ion-exchange unit capable of filtering out part of said microorganisms and part of said other organic matter; and simultaneously introducing bactericidal chlorine into said source water by electrolytic dissociation of said chlorine compounds within said ion-exchange unit in amounts above potable water limits and sufficient to maintain the microorganism level to between about 100 per gram to about 5,000 per gram of ion-exchange material, but low enough to produce an effluent chlorine concentration in said purified water of less than about 0.2 p.p.m.

2. The method of claim 1 wherein said chlorine compounds are introduced into said source water immediately prior to the entry of sai dsource water into said ion-exchange unit.

3. The method of claim 1 wherein said chlorine is formed electrolytically at electrodes located about ¼ to about ⅓ of the total length of said ion-exchange unit from the inlet end of said ion-exchange unit.

4. A method of purifying an aqueous medium containing chloride compounds in systems wherein said aqueous medium flows through purification material capable of filtering microorganisms and other material from said aqueous medium, comprising:

introducing bactericidal chlorine into said aqueous medium by electrolytic dissociation of said chloride compound within said purification material in concentrations substantially above potable limits as said medium flows through said purification material to react with said microorganisms; and removing any chlorine in the effluent water leaving said material that is in excess of potable water limits.

References Cited

UNITED STATES PATENTS

| 1,869,643 | 8/1932 | Adler et al. | 210—62 |
| 3,223,242 | 12/1965 | Murray | 210—62 X |
| 3,351,542 | 11/1967 | Oldershaw et al. | 210—62 X |

FOREIGN PATENTS

| 457,098 | 5/1949 | Canada | 210—62 |

OTHER REFERENCES

Braithwaite, D. G., et al., Effect of Chlorine on Cation Exchange Resins, Ind. & Eng. Chem., vol. 42, February 1950, pp. 312–315.

MICHAEL ROGERS, Primary Examiner

U.S. Cl. X.R.

204—152; 210—62, 209, 287